Aug. 4, 1959  M. D. PATRICHI  2,897,583
METHOD OF FUSING METAL TO GLASS ARTICLES
Filed Oct. 15, 1956
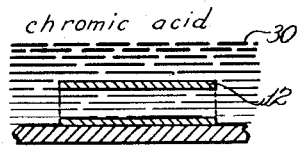
Fig. 1.
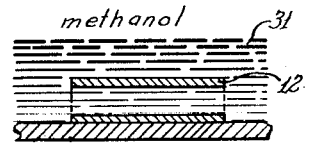
Fig. 2.
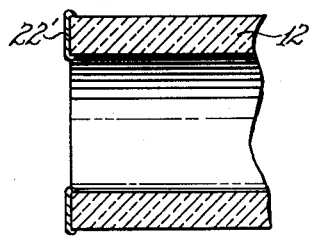
Fig. 3.
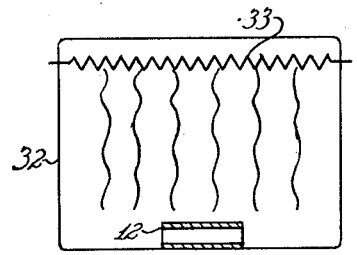
Fig. 4.
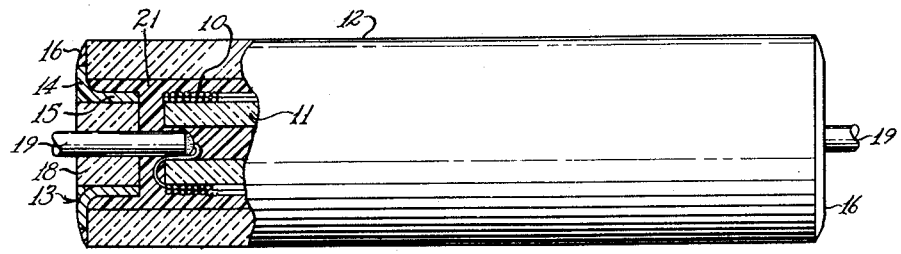
Fig. 6.
Fig. 5.
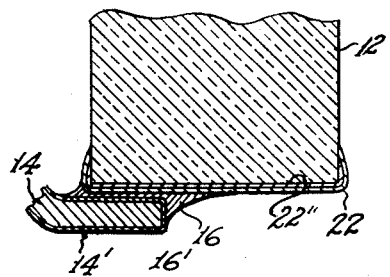
INVENTOR.
MIHAI D. PATRICHI
BY
Sellers and Latta
ATTORNEYS United States Patent Office 2,897,583
Patented Aug. 4, 1959

2,897,583

METHOD OF FUSING METAL TO GLASS ARTICLES

Mihai D. Patrichi, Woodland Hills, Calif., assignor to Networks Electronic Corporation, Van Nuys, Calif., a corporation of California Application October 15, 1956, Serial No. 616,091

4 Claims. (Cl. 29—155.5)

This invention relates to the art of joining metal to glass. Its general object is to provide an improved method of fusing metal to glass so as to obtain a hermetically sealed joint. The invention is useful in the fabrication of electrical components such as resistors, induction coils, condensers, electron discharge tubes, incandescent lamps, etc. where it is desirable that a strong, permanent, leak-proof seal and bond be established between a glass casing or envelope or the like, and metal parts passing through the casing or simply attached thereto. The invention may also be applied to various other articles compositely fabricated of glass and metal.

A particular object of the invention is to provide a method of fabricating articles of glass and metal parts joined to one another by joints of high mechanical strength, highly resistant to shocks and vibration and extremely durable.

Another object is to provide a method of joining metal to glass with permanent hermetically sealed joints.

An important object is to provide a method of joining metal to glass to provide articles that will endure extremely high temperatures without breaking down.

Other objects will become apparent in the ensuing specifications and appended drawings in which:

Fig. 1 is a schematic illustration of a cleaning step;

Fig. 2 is a schematic illustration of another cleaning step;

Fig. 3 illustrates a step of coating a conductive paste to a surface to be metallized;

Fig. 4 is a schematic illustration of the step of annealing and fusing the coated article and its coating;

Fig. 5 illustrates an electroplating step; and

Fig. 6 is a view, partially in section, of a finished article processed in accordance with my invention.

Referring now to the drawing in detail, I have shown therein, as an example of one possible application of my invention, a series of steps in the fabrication of a resistor such as that disclosed more fully in my copending application Serial Number 615,981, filed October 15, 1956, although the invention may be applied equally as well to a thermal relay as shown in said co-pending application or to other higher requirement electrical units. Such a resistor (Fig. 6) may embody a coil 10 of resistance wire wound upon an annealed Pyrex glass mandrel 11 embedded in a core body 21 of potting latex contained within a casing comprising a Pyrex glass tube 12 and end caps (headers) 13 of composite construction including metal ferrule parts 14, 15 and grommets 18 fused into the collar parts 15 of the ferrules, the flange parts 14 thereof being fused at 16 to metal coatings 22 on the ends of tube 12, and terminal rods 19 being fused into the bores of grommets 18. The illustration of the invention given herein relates to the development of the metal coatings 22 on the ends of tube 12, but the method is equally applied to the development of metal coatings within the bore and on the periphery of grommets 18.

In the practice of the method of my invention, the glass parts are preliminarily prepared by water washing and thorough cleansing in methanol for at least 15 minutes.

Referring now to Fig. 1, the parts are then immersed and soaked in chromic acid solution 30 for at least 30 minutes. The parts are then removed, excess acid is strained off, and the parts are washed in water. The parts are then placed in a methanol bath 31 (Fig. 2) and soaked for a minimum of 30 minutes. From this point on, the parts are handled without being touched by the naked hand.

The parts are then air-dried thoroughly. A conductive paste 22' is then applied to the areas that are to be fused to metal, such as the ends of casing tubes 12. Fig. 3 shows the coating of paste applied to one end of a tube. The paste may be a mixture of powdered silver, chromium, gold, etc. with 40% toluene. Care is taken, in applying the coating, to avoid thin spots. The coating may be applied by brushing. The coating is then allowed to air dry, and is thereafter protected so as to be kept free of dirt, dust, etc.

As indicated in Fig. 4, the coated parts are then heat treated in an electric oven 32 to anneal the glass and fuse the coating 22'. In this fusing step, the oven temperature is gradually and slowly increased from room temperature to the range of 1140° F. When this temperature is reached, the heater 33 is immediately turned off and the door of the oven is opened slightly to allow the oven heat to slowly escape. When the oven temperature has declined to room temperature, the annealed parts 12, with thin films 22" (Fig. 5) of metal fused on their end surfaces, are removed from the oven. The annealing and fusing procedure just described is strictly adhered to to avoid shattering of the glass.

In the next step of the process, the metalized surfaces 22" are electroplated to build up additional metal deposits thereon, thereby producing the substantial metal coatings 22 (Fig. 5) which are suitable for ensuing soldering or fusing operations. Any metal commonly used satisfactorily in commercial electroplating processes, can be used in producing the coating 22.

In the next step of the process, metal parts such as the ferrule parts 14, 15 of headers 13, are fused to coatings 22, to provide shock and vibration resistant hermetic joints 16 (Fig 6). The fusing step may involve an operation wherein a high temperature solder paste (e.g. silver solder paste) is applied to one or both of the metal surfaces (e.g. 22, 14), the parts assembled and held in proper relative positions and the assembly then heated to the fusing temperature of the solder to convert the paste into a film of molten metal providing molecular adhesion (fusion) between the metal surfaces. Alternatively, the parts may be assembled without the application of solder paste, and may then be joined by other known soldering processes, such as the application of rings of solder wire to the joints at one end thereof, and the subsequent heating of the assemblies to melt the solder and cause it to seep by capillary action into the joints, or by hand soldering around the borders, or combining two soldering processes. The processes and the fusing alloys used are consistent with meeting a wide range of temperature and strength requirements.

In the step of applying the initial metal coating to the glass, the preferred method is to apply a suspension of powdered noble metal particles in a liquid such as toluene that is evaporated away in the fusing step, leaving a molecular film of noble metal fused to the glass. Alternative known methods of applying such a molecular film may be also employed. In the next step, wherein additional metal is electrodeposited on the molecular film, a metal (such as copper) that will provide a good base for the subsequent soldering of the coating to a metal such as Kovar, is used. In the final step of joining the parts, there is developed a solder film that securely joins the copper coating to the metal part.

Kovar is an alloy of iron, nickel and cobalt having practically the same coefficient of thermal expansion as hard glass up to about 465° C.

Where the metal part (e.g. header 14) is of a non-noble metal, such as Kovar, the surface of the metal part is pre-coated with a fourth coating 14' of noble metal, shown in Fig. 5, so that the solder will establish a good bond with the metal part. Alternatively, the metal part may be solidly of noble metal, in which case the surface thereof constitutes the noble metal "coating."

The thin film of solder bridging between the metal part and the coating 22 is indicated at 16' in Fig. 5. Regarding the noble metal surface 14' of the metal part 14 as a coating, it will now be apparent that, in the practice of my process, the metal part becomes joined to the glass part by four separate coatings, including (1) the very thin coating 22" of a noble metal (e.g. silver) fused to the glass surface in a thin, evenly distributed molecular film (e.g. a film of a thinness in the order of .0005 inch to .005 inch); (2) applying, as by electro-depositing, a coating 22 of metal (such as copper) that adheres well to such a molecular film and provides a good metal surface for good adherence of (3) the film 16' of solder (e.g. silver solder) which unites the pre-coated glass part to the noble metal surface 14' of the metal part; and (4) the coating or surface 14'.

The connection thus provided is hermetically tight, possesses great strength, and shows no sign of weakness over the extreme temperature range of minus 65 degrees F. to plus 500 degrees F. or more.

With the method outlined above it is now possible to securely fasten metal to glass for either structural strength or for the purpose of hermetic sealing. In the case of hermetic sealing the special annealing given the glass will permit its use in encasing an unlimited number of devices which will permit their use at temperature extremes.

I claim:

1. A method of fabricating an hermetically sealed electrical circuit component device of high electrical and mechanical requirements, and of cylindrical form wherein respective terminal, grommet, ferrule and barrel parts are sealed, one within another in the order named, wherein said barrel and the periphery of said grommet are substantially cylindrical, wherein said ferrule is substantially rigid and embodies a radial flange sealed to the end of said barrel and a substantially cylindrical collar extending from the inner margin of said flange into the barrel in adjacent concentric relation to the inner wall thereof and encircling and sealed to the periphery of said grommet, and wherein said barrel and grommet parts are of glass having strength and thermal characteristics equivalent to those of Pyrex glass and said terminal and ferrule parts are of metal having the characteristics of Kovar metal; said method comprising the following steps: fusing the terminal into the grommet and thereby sealing these parts to one another; cleaning, drying and then coating the periphery of the grommet and the end surface of the barrel with a thin coating consisting essentially of a suspension of noble metal particles in a solvent having the evaporating, suspending and non-residue properties of toluene; then heating the coated glass parts to the range of approximately 1140° Fahrenheit to simultaneously anneal the glass parts and to fuse the noble metal particles into molecular filams having a thickness in the range of .0005" to .005", bonded to said glass parts; electrodepositing layers of copper upon said noble metal films; electrodepositing a coating of noble metal upon said ferrule; then assembling the glass and metal parts with a ring of high temperature solder; and finally heating the assembly of glass and metal parts and solder to cause the solder to liquify and flow into the joints between said noble metal coating on the ferrule and said copper layers on the glass parts, whereby to bond said noble metal coating to said copper layers and thereby seal said grommet into said collar and said flange to the end of said barrel.

2. The method described in claim 1, wherein silver solder is utilized in the soldering step and in developing said noble metal films.

3. A method of fabricating an hermetically sealed electrical circuit component device of high electrical and mechanical requirements, and of cylindrical form wherein respective terminal, grommet, ferrule and barrel parts are sealed, one within another in the order named, wherein said barrel and the periphery of said grommet are substantially cylindrical, wherein said ferrule is substantially rigid and embodies a radial flange sealed to the end of said barrel and a substantially cylindrical collar extending from the inner margin of said flange into the barrel in adjacent concentric relation to the inner wall thereof and encircling and sealed to the periphery of said grommet, and wherein said barrel and grommet parts are of glass having strength and thermal characteristics equivalent to those of Pyrex glass and said terminal and ferrule parts are of metal having the characteristics of Kovar metal; said method comprising the following steps: fusing the terminal into the grommet and the grommet into said collar and thereby sealing these parts to one another; cleaning, drying and then coating the end surface of the barrel with a thin coating consisting essentially of a suspension of noble metal particles in a solvent having the evaporating, suspending and non-residue properties of toluene; then heating the coated barrel to the range of approximately 1140° Fahrenheit to simultaneously anneal the barrel and to fuse the noble metal particles into a molecular film having a thickness in the range of .0005" to .005", bonded to said barrel; electrodepositing a layer of copper upon said noble metal film; electrodepositing a coating of noble metal upon said ferrule; then assembling the barrel and ferrule with a ring of silver solder; and finally heating the assembly of glass and metal parts and solder to cause the solder to liquify and flow into the joint between said noble metal coating on the ferrule and said copper layer on the barrel, whereby to bond said noble metal coating to said copper layer and thereby seal said flange to the end of said barrel.

4. The method defined in claim 1, wherein said ferrule is bonded to said barrel in an area restricted substantially to the area of said flange and wherein said collar is arranged within said barrel in spaced relation to the inner wall thereof.

References Cited in the file of this patent

UNITED STATES PATENTS

| | | |
|---|---|---|
| 2,075,477 | Smith | Mar. 30, 1937 |
| 2,335,376 | Ballintine et al. | Nov. 30, 1943 |
| 2,379,635 | Hastings | July 3, 1945 |
| 2,490,776 | Braunsdorff | Dec. 13, 1949 |
| 2,527,587 | Smyth | Oct. 31, 1950 |
| 2,708,787 | Chick et al. | May 24, 1955 |